United States Patent [19]
Yamamoto et al.

[11] Patent Number: 5,316,862
[45] Date of Patent: May 31, 1994

[54] MAGNETIC RECORDING MEDIUM, COMPRISING MAGNETIC POWDER AND A SULFOXIDE GROUP CONTAINING VINYL CHLORIDE COPOLYMER BINDER RESIN

[75] Inventors: Tamotsu Yamamoto, Kitamoto; Kenji Akimoto, Kawasaki, both of Japan

[73] Assignee: Nippon Zeon Co., Ltd., Tokyo, Japan

[21] Appl. No.: 833,714

[22] Filed: Feb. 11, 1992

[30] Foreign Application Priority Data

Feb. 18, 1991 [JP] Japan .................................. 3-045842

[51] Int. Cl.$^5$ .............................................. G11B 5/00
[52] U.S. Cl. ................. 428/522; 428/694 B; 428/900
[58] Field of Search ............ 428/694, 900, 522, 694 B

[56] References Cited

U.S. PATENT DOCUMENTS 4,734,330  3/1988  Oiyama et al. .................... 428/411.1
4,743,501  5/1988  Eguchi et al. ....................... 428/328

FOREIGN PATENT DOCUMENTS 59-219308  12/1084  Japan .

*Primary Examiner*—Stevan A. Resan
*Attorney, Agent, or Firm*—Sherman and Shalloway

[57] ABSTRACT

The present invention provides a magnetic recording medium comprising a non-magnetic substrate and a magnetic layer formed on a substrate, comprising (a) a binder containing a vinyl chloride resin having sulfoxide groups and (b) a magnetic powder dispersed in the binder (a); and a binder used in said medium for dispersion of magnetic powder, containing a vinyl chloride resin containing sulfoxide groups. The present invention further provides a process for producing said vinyl chloride resin (a binder resin) having sulfoxide groups. The use of the binder resin of the present invention makes it possible to obtain a magnetic coating in which a fine magnetic powder is dispersed stably and which has good coatability. The magnetic recording medium obtained using the magnetic coating has good surface smoothness and good surface durability and is excellent in travelling, magnetic property and electromagnetic conversion property.

7 Claims, No Drawings

MAGNETIC RECORDING MEDIUM, COMPRISING MAGNETIC POWDER AND A SULFOXIDE GROUP CONTAINING VINYL CHLORIDE COPOLYMER BINDER RESIN

The present invention relates to a magnetic recording medium such as magnetic tape or the like comprising a non-magnetic substrate and a magnetic layer comprising (a) a binder and (b) a magnetic powder dispersed in the binder (a), as well as to a binder used in the magnetic recording medium.

Magnetic recording media such as magnetic tape, floppy disc and the like are generally produced by coating, on a polymer film or sheet, a magnetic coating obtained by dispersing a ferromagnetic powder in an organic solvent using an organic polymer as a binder.

With recent requirements for magnetic recording medium of increased recording density and improved SlN ratio (signal/noise ratio), the magnetic powder used therein has become finer and coercive force becomes higher. In order to obtain a magnetic coating wherein such a magnetic powder is uniformly dispersed and which can form a smooth and dense magnetic layer and thereby can give a magnetic recording medium satisfying the above requirements, the dispersibility for the magnetic powder, to be possessed by a binder resin used in the magnetic coating is a detrimentally important factor.

Meanwhile, as the fine magnetic powder is dispersed to a higher degree, the resulting magnetic coating has a higher viscosity and tends to produce problems in the coating step. Hence, it is necessary to increase the dispersion degree of the magnetic powder while appropriately controlling the viscosity of the magnetic coating.

In order to improve the dispersion degree of magnetic powder and the viscosity of magnetic coating, surface active agents of low molecular weight have been used as a dispersing agent. These dispersing agents, however, have had a limitation in the amount used because of the durability of resulting magnetic recording medium, the staining of recording head, etc. Hence, in order for the magnetic recording medium to have higher reliability, it is required to reduce the amount of dispersing agent used and allow the binder resin itself to have a high dispersibility for magnetic powder.

The present inventors previously made study on an improved binder capable of providing a magnetic recording medium of high performance as mentioned above and evaluated various vinyl chloride resins hitherto known as a binder for magnetic powder. As a result, the present inventors found that vinyl chloride-vinyl alcohol-vinyl acetate copolymers have a higher dispersibility for magnetic powder as the portion of vinyl alcohol in copolymer increases but, since the dispersibility is low, they require the assistance of a dispersing agent and that vinyl chloride-maleic acid-vinyl acetate copolymers are strongly adsorbed by a magnetic powder to exhibit an excellent dispersibility for the magnetic powder but give a magnetic coating of high viscosity which easily undergoes gelation.

In order to solve the above problems of these vinyl chloride resins, it was proposed to use vinyl chloride-vinyl alcohol-vinyl acetate copolymers having anionic hydrophilic groups obtained by (a) replacing the part of the hydroxyl groups of a vinyl chloride-vinyl alcohol-vinyl acetate copolymer with a hydrophilic group such as COOM, $SO_3M$, $SO_4M$, $PO(OM)_2$ or the like (M is hydrogen, an alkali metal or ammonium) (Japanese Patent Application Laid-Open No. 44227/1982) or by (b) saponifying a vinyl chloride-vinyl acetate copolymer having such hydrophilic groups (Japanese Patent Application Laid-Open Nos. 114330/1983, 57640/1986, 96515/1986). The above polymers are slightly improved in dispersibility but has no sufficient dispersibility yet.

In order to meet the high performance requirements for magnetic recording medium, the object of the present invention is to provide a binder having good dispersibility for magnetic powder.

The present inventors made study in order to achieve the above object. As a result, the present inventors found that a coating using a particular vinyl chloride resin promises a high dispersibility for magnetic powder and that the magnetic recording medium obtained using the coating has good surface smoothness and good surface durability and is excellent in travelling, magnetic property and electromagnetic conversion property.

According to the present invention, there are provided a magnetic recording medium comprising a non-magnetic substrate and a magnetic layer formed on the substrate, comprising (a) a binder containing a vinyl chloride resin having sulfoxide groups and (b) a magnetic powder dispersed in the binder (a), and a binder used in the above magnetic recording medium for dispersion of magnetic powder, containing a vinyl chloride resin having sulfoxide groups. According to the present invention, there is also provided, as one process for producing the vinyl chloride resin having sulfoxide groups, contained in the above binder, a process (this process is hereinafter referred to as the first process) which comprises reacting the hydroxyl groups of a vinyl chloride resin having hydroxyl groups at the side chains, with an acid halide having a sulfide group to obtain a vinyl chloride resin having sulfide groups at the side chains and then oxidizing the sulfide groups to obtain a vinyl chloride resin having sulfoxide groups at the side chains.

As the vinyl chloride resin having hydroxyl groups, used as a starting material in the first process, there can be used, for example, copolymers having hydroxyl groups, obtained by saponifying a vinyl chloride-vinyl carboxylate copolymer, and copolymers between vinyl chloride and a hydroxyl group-containing monomer copolymerizable therewith.

Examples of the hydroxyl group-containing monomer copolymerizable with vinyl chloride include $C_2$-$C_8$ alkanol esters of $\alpha,\beta$-unsaturated acids, and as 2-hydroxyethyl (meth)acrylate, 2-hydroxypropyl (meth)acrylate and the like; esters between a polyalkylene glycol represented by the formula $CH_2=CR-COO-(C_nH_{2n}O)_m-H$ (m is an integer of 2-9, n is an integer of 2-4 and R is a hydrogen atom or a methyl group) and (meth)acrylic acid; mono(meth)acrylic acid esters of dihydroxy esters of dicarboxylic acids, such as 2-hydroxyethyl 2'-(meth)-acryloyloxyphthalate, 2-hydroxyethyl 2'-(meth)acryloyloxysuccinate and the like; (meth)acrylamides such as N-methylol(meth)acrylamide and the like; alkylene glycol esters of unsaturated dicarboxylic acids, such as di-2-hydroxyethyl maleate, di-4-hydroxybutyl maleate, di-2-hydroxypropyl itaconate and the like; olefin alcohols such as 3-buten-1-ol, 5-hexen-1-ol and the like; vinyl esters such as 2-hydroxyethyl vinyl ether, 2-hydroxypropyl vinyl ether and the like; mono(meth)allyl ethers of alkylene glycols, such as (meth)allyl 2-hydroxyethyl ether, (meth)allyl 2-hydroxypropyl ether, (meth)allyl 3-hydroxypropyl ether, (meth)allyl 2-hydroxybutyl ether, (meth)allyl 3-hydroxybutyl ether, (meth)allyl 4-hydroxybutyl ether, (meth)allyl 6-hydroxyhexyl ether and like; polyoxyalkylene glycol (meth)monoallyl ethers such as diethylene glycol (meth)monoallyl ether, dipropylene glycol mono(meth)allyl ether and the like; glycerine mono(meth)allyl ether; halogenated (poly)alkylene glycols such as (meth)allyl 2-chloro-3-hydroxypropyl ether, (meth)allyl 2-hydroxy-3-chloropropyl ether and the like; hydroxylated mono(meth)allyl ethers; mono(meth)allyl ethers of polyhydric phenols and halogenated derivatives thereof, such as eugenol, isoeugenol and the like; (meth)allyl thioethers of alkylene glycols, such as (meth)allyl 2-hydroxyethyl thioether, (meth)allyl 2-hydroxypropyl thioether and the like; vinyl alcohol; and (meth)allyl alcohol.

Of these, (meth)allyl ethers of polyhydroxy compounds and mono(meth)thioallyl ethers are preferable in view of the thermal stability and reactivity. The amount of the hydroxyl groups introduced into the resulting copolymer by such a hydroxyl group-containing monomer is 0.2-8% by weight, preferably 1-5% by weight based on the weight of the copolymer.

The vinyl chloride resin having hydroxyl groups may be derived from vinyl chloride, a hydroxyl group-containing monomer and other monomer copolymerizable with vinyl chloride. As the other monomer copolymerizable with vinyl chloride, there can be used, for example, vinyl carboxylates such as vinyl acetate, vinyl propionate and the like; vinyl ethers such as methyl vinyl ether, isobutyl vinyl ether, cetyl vinyl ether and the like; vinylidenes such as vinylidene chloride, vinylidene fluoride and the like; unsaturated carboxylic acid esters such as diethyl maleate, butyl benzyl maleate, dimethyl itaconate, methyl (meth)acrylate, ethyl (meth)acrylate, lauryl (meth)acrylate and the like; olefins such as ethylene, propylene and the like; unsaturated nitriles such as (meth)acrylonitrile and the like; and aromatic vinyls such as styrene, α-methylstyrene, p-methylstyrene and the like.

These monomers are appropriately selected so that the resin of the present invention produced therewith has a desired compatibility with other resin when the latter resin is used in combination with the former resin, has a desired solubility while having a required softening point, gives a desired coating film and poses no problem in the coating step employed.

The vinyl chloride resin having hydroxyl groups has an average polymerization degree of 100-900, preferably 200-500 and a vinyl chloride content of 60 mole % or more. When the polymerization degree is less than 100, the resulting magnetic layer has insufficient wear resistance. When the polymerization degree is more than 900, the dispersion of magnetic powder in binder tends to be insufficient. When the vinyl chloride content is less than 60 mole %, the vinyl chloride resin has low compatibility with flexible material and the solvent evaporation from coating film is extremely slow.

By reacting the hydroxyl groups of the above-described vinyl chloride resin having hydroxyl groups, with ClCOCH$_2$CH$_2$SCH$_3$, ClCOCH$_2$SCH$_2$CH$_3$ or the like using a dehydrochlorinating agent such as amine (e.g. pyridine, picoline, triethylamine), epoxy compound (e.g. ethylene oxide, propylene oxide) or the like in the presence of a solvent such as tetrahydrofuran, dimethylformamide, dimethyl sulfoxide or the like, a resin having sulfide groups, such as the following is formed.

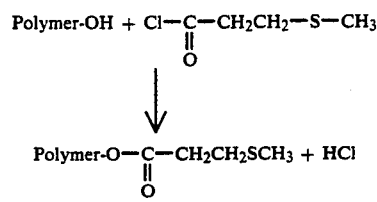

Then, the resin having sulfide groups is oxidized with a peracid (e.g. hydrogen peroxide, peracetic acid, perbenzoic acid), sodium metaperiodate or the like in the presence of a solvent such as acetone or the like, whereby a resin having sulfoxide groups, such as the following can be obtained.

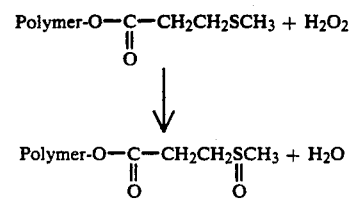

In the vinyl chloride resin having sulfoxide groups, contained in the binder of the present invention, the amount of sulfoxide groups (—SO—) is 0.5-15% by weight, preferably 1-7% by weight. When the amount of sulfoxide groups is less than 0.5% by weight, the effect of the sulfoxide groups is insufficient. When the amount is more than 15% by weight, the vinyl chloride resin has too strong hydrophilicity, causing problems in solubility in solvent or compatibility with other binder component(s).

In the magnetic recording medium of the present invention, the vinyl chloride resin having sulfoxide groups may be used alone as a binder for magnetic powder, but ordinarily is used in combination with other binder component(s). That is, in the present invention, the vinyl chloride resin having sulfoxide groups can be used in an amount of 10-100% by weight based on the total binder amount.

The other binder component(s) used in combination with the vinyl chloride resin having sulfoxide groups, has (have) no particular restriction. As other binder component(s), there can be used thermoplastic resins such as vinyl chloride-vinyl acetate copolymer, vinyl chloride-vinyl acetate-maleic acid and/or (meth)acrylic acid copolymer, vinyl chloride-vinyl propionate copolymer, saponification products of the above vinyl chloride-vinyl carboxylate copolymers, vinyl chloride-vinylidene chloride copolymer, vinyl chloride-acrylonirile copolymer, (meth)acrylic acid ester-acrylonitrile copolymers, (meth)acrylic acid ester-vinylidene chloride copolymers, (meth)acrylic acid ester-styrene copolmyers, nylon-silicone resin, nitrocellulose-polyamide resins, polyvinyl fluoride, vinylidene chloride-acrylonitrile copolymer, butadiene-acrylonitrile copolymer, styrene-butadiene copolymer, styrene-butadiene-acrylontirile copolymer, polyamide resins, polyvinyl butyral, cellulose derivatives (cellulose acetate butyrate, cellulose acetate propionate, cellulose diacetate, cellulose triacetate, nitrocellulose, etc.), polyester resins, polyurethane resins, chlorovinyl ether-acrylic acid ester copolymers, various synthetic rubbers and the like; and thermosetting resins such as phenolic resin, phenoxy resin, urea resin, melamine resin, alkyd resin, silicone resin, acrylic reactive resin, epoxypolyamide resins, nitrocellulose-melamine resin and the like.

These binder components may have other functional groups known per se. Such functional groups are preferably at least one functional group selected from the group consisting of $-SO_4M$, $-SO_3M$, $-SO_2M$, $-COOM$, $-NH_2$, $-N^+R_3X^-$, $-OH$, a phosphoric acid group and a phosphoric acid ester group (M represents a hydrogen atom or an alkali metal atom, and R represents an organic group such as alkyl, allyl, alkenyl, alkoxyl or the like). The amount of these functional groups is preferably $1 \times 10^{-6}$ to $1 \times 10^{-2}$ equivalent per 1 g of resin.

The vinyl chloride resin having sulfoxide groups, contained in the binder of the present invention can also be produced according to the second process. That is, a copolymer obtained by copolymerizing a vinyl chloride monomer with a monomer having a sulfide group is oxidized to obtain a vinyl chloride resin having sulfoxide groups.

The monomer having a sulfide group, used in the second process has no particular restriction as long as it is copolymerizable with the vinyl chloride monomer. As such a monomer, there can be mentioned, for example, methylthioethene, 3-methylthiopropene, 4-methylthiobutene, 4-ethylthiobutene, 3-ethylthiopropene and 4-(n-butylthio)-2-butene.

The second process is described more specifically. The monomer having a sulfide groups is copolymerized with vinyl chloride, and the resulting resin having sulfide groups is oxidized with hydrogen peroxide, perbenzoic acid, sodium metaperiodate, peracetic acid or the like in a solvent such as acetone, THF or the like to obtain a resin having sulfoxide groups. In the copolymerization between the monomer having a sulfide group and vinyl chloride, other monomers mentioned in the first process may be used in combination as necessary.

The vinyl chloride resin having sulfoxide groups, contained in the binder of the present invention can also be produced according to the third process. That is, a vinyl chloride monomer and a monomer having a sulfoxide group are copolymerized to directly obtain a desired vinyl chloride resin having sulfoxide groups.

The monomer having a sulfoxide group, used in the third process has no particular restriction as long as it is copolymerizable with the vinyl chloride monomer. As such a monomer, there can be mentioned, for example, methylsulfoxylethene, 3-methylsulfoxylpropene, 3-methylsulfoxylbutene, 4-ethylsulfoxylbutene, 3-ethylsulfoxylpropene and n-butylsulfoxyl-2-butene.

In the copolymerization between the monomer having a sulfoxide group and vinyl chloride, other monomers copolymerizable with vinyl chloride can be used in combination as necessary, as in the first and second processes.

In the present invention, the vinyl chloride copolymers used in the first and second processes as starting materials and the vinyl chloride copolymer obtained in the third process as a final product can all be produced by any of known polymerization methods.

Viewed from the solubility, these copolymers are preferably produced by a solution polymerization method or by a suspension polymerization method using, as the polymerization medium, a lower alcohol (e.g. methanol, ethanol) alone or a combination of the lower alcohol with deionized water.

As the polymerization initiator used in the first to third processes for production of the resin of the present invention, there can be mentioned, for example, organic peroxides such as laurolyl peroxide, diisopropyl peroxydicarboante, di-2-ethylhexyl peroxydicarbonate, tert-butyl peroxypivalate, 3,5,5-trimethylhexanoyl peroxide and the like; azo compounds such as $\alpha,\alpha'$-azobisisobutyronitrile and the like; and ammonium persulfate and potassium persulfate.

As the suspending agent used in the production process of the present invention, there can be mentioned, for example, synthetic polymers such as polyvinyl alcohol, partial saponifiction product of polyvinyl acetate, cellulose derivatives (e.g. methyl cellulose), polyvinyl pyrrolidone, maleic anhydride-vinyl acetate copolymer, polyacrylamide and the like; and natural polymers such as starch, gelatin and the like.

As the emulsifier used in the production process of the present invention, there can be mentioned, for example, anionic emulifiers such as sodium alkylbenzenesulfonate, sodium lauryl sulfate and the like; and nonionic emulsifiers such as polyoxyethylene alkyl ethers, polyoxyethylenesorbitan/fatty acid partial esters and the like. As necessary, a molecular weight modifier such as trichloroethylene, thioglycol or the like can be used.

The polymerization initiator, vinyl chloride and other monomers, suspending agent, emulsifier, molecular weight modifier, etc. described above may be added to the polymerization system in one portion at the start of polymerization, or in portions during polymerization.

The polymerization reaction is ordinarily conducted at a temperature of 35°–80° C. with stirring.

The resulting polymer preferably has an average polymerization degree of 100–900, preferably 200–500 and a vinyl chloride unit amount in polymer chain, of 60 mole % or more.

When the polymerization degree is less than 100, the magnetic layer containing the polymer has insufficient wear resistance. When the polymerization degree is more than 900, the resulting coating tends to have a high viscosity and the dispersion of magnetic powder tends to be insufficient. When the vinyl chloride unit amount is less than 60 mole %, the polymer has low compatibility with a flexible material and the solvent evaporation from coating film is extremely slow.

The vinyl chloride resin having sulfoxide groups, contained in the binder of the present invention may be produced by any production method as long as the produced resin has such a structure that the polymer chain containing vinyl chloride units has some sulfoxide groups as the side chains.

In the magnetic recording medium of the present invention, the amount of total binder in magnetic layer is ordinarily 10–100 parts by weight, preferably 15–40 parts by weight per 100 parts by weight of ferromagnetic powder.

The binder of the present invention is mixed with a solvent composed mainly of a ketone, together with known materials such as magnetic powder, lubricant, polishing agent, antistatic agent, curing agent and, as necessary, dispersing agent, etc.; the mixture is subjected to a dispersion treatment to obtain a magnetic coating; the coating is coated on a non-magnetic substrate typified by a polyester film; the resulting film is subjected to an orientation treatment and a surface formation treatment and, depending upon the application of the resulting magnetic recording medium, further to a heat treatment (for crosslinking) and surface polishing; the resulting material is subjected to a cutting step, an assembling step, etc. to obtain a magnetic recording medium of the present invention.

The ferromagnetic powder used in the present invention is particularly preferably a fine powder. There can be mentioned, for example, a ferromagnetic iron oxide powder such as $\gamma$-$Fe_2O_3$, $Fe_3O_4$, $\gamma$-$FeO_x$ ($1.33 < x < 1.5$) or the like; a Co-doped ferromagnetic iron oxide powder; a ferromagnetic chromium dioxide powder; a ferromagnetic metal powder; barium ferrite; an iron carbide (e.g. $Fe_5C_2$) powder; and an iron nitride powder.

The ferromagnetic metal powder is a ferromagnetic metal powder containing iron, cobalt or nickel. Examples thereof include an alloy containing 75% by weight or more of a metal, wherein 80% by weight or more of the metal is at least one ferromagnetic metal or alloy (e.g. Al, Fe, Co, Ni, Fe-Co, Fe-Ni, Co-Ni, Co-Ni-Fe) and which may contain 20% by weight or less, based on the metal, of other components (e.g. Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, P).

The production methods for these ferromagnetic powders are known, and the ferromagnetic powder used in the present invention can be produced by one of these known methods.

The shape of the ferromagnetic powder used in the present invention has no particular restriction, but a ferromagnetic powder having an acicular shape, a granular shape, a die shape, a rice grain shape, a plate shape or the like can be used ordinarily.

Examples of the lubricant used in the present invention are fatty acids of 8-18 carbon atoms, higher alcohols, amides and fatty acid esters. Specific examples are caprylic acid, capric acid, lauric acid, myristic acid, palmitic acid, stearic acid, oleic acid, elaidic acid, linoleic acid, linolenic acid, stearolic acid, stearyl alcohol, palmityl alcohol, laurylamide, dimethylstearylamide, butyllaurylamide, butyl stearate, octyl stearate and sorbitan oleate. There can also be used a silicone oil, a fluorine-containing oil (e.g. polyperfluoroalkylene oxide, perfluoroalkane), a paraffin wax, an oxidized polyethylene, etc. There can also be used solid lubricants such as carbon black, graphite, molybdenum disulfide, tungsten disulfide and the like. There lubricants are used in an amount of 1-6 parts by weight per 100 parts by weight of magnetic powder.

As the polishing agent (inorganic filler), there can be mentioned, $TiO_2$, $TiO$, $ZnO$, $CaO$, $SnO_2$, $SiO_2$, $\alpha$-$Fe_2O_3$, $Cr_2O_3$, $\alpha$-$Al_2O_3$, $ZnS$, $MoS_2$, $BaSO_4$, $CaSO_4$, $MgCO_3$, $BN$, $SiC$, etc. These agents can be used alone or in combination of two or more.

As the antistatic agent, there can be mentioned conductive fine powders such as carbon black, carbon black grafted polymer and the like; natural surface active agents such as saponin and the like; nonionic surface active agents such as alkylene oxide type, glycerine type, glycidol type and the like; cationic surface active agents such as higher alkylamine, quaternary ammonium salt, salt of pyridine or other heterocyclic compound, phosphonium, sulfonium and the like; anionic surface active agents containing acidic groups such as carboxylic acid group, sulfonic acid group, phosphoric acid group, sulfuric acid ester group, phosphoric acid ester group and the like; amphoteric surface active agents such as amino acid, aminosulfonic acid, sulfuric acid or phosphoric acid ester of aminoalcohol, and the like; and so forth.

A dispersing agent can be used as necessary in the magnetic recording medium of the present invention. Examples of the dispersing agent usable in the present invention are known dispersing agents such as fatty acid of 10-22 carbon atoms (e.g. caprylic acid, capric acid, lauric acid, myristic acid, palmitic acid, stearic acid, oleic acid, elaidic acid, linoleic acid, linolenic acid, stearolic acid), metal soap made of the above fatty acid and an alkali metal (e.g. lithium, sodium potassium) or an alkaline earth metal (e.g. magnesium, calcium, barium), ester of the above fatty acid, compound obtained by replacing the part or all of the hydrogen atoms of said ester with fluorine atom(s), amide of the above fatty acid, aliphatic amine, higher alcohol, polyalkylene oxide alkyl phosphate, alkyl phosphate, alkyl borate, sarcosinate, alkyl ether ester, quaternary trialkyl-polyolefinoxy ammonium salt, lecithin and the like.

The present invention is hereinafter described more specifically by way of Examples.

EXAMPLE 1

Into a 10-liter reactor provided with a stirring propeller, a thermometer and a condenser were fed 500 g of a vinyl-chloride-vinyl acetate-vinyl alcohol copolymer (average polymerization degree=400, OH content=2.2% by weight) and 5 liters of tetrahydrofuran. After the resin was dissolved, 500 ml of 3-methylthiopropionyl chloride and 173 ml of pyridine were added, and the mixture was subjected to a reaction at room temperature for 58 hours. Then, methanol was added to precipitate a resin. The resin was washed with diethyl ether and then vacuum-dried. The resulting resin was dissolved in 5 liters of acetone. Thereto were added 60 g of 30% hydrogen peroxide and 500 ml of glacial acetic acid. The mixture was subjected to a reaction at room temperature for 12 hours, and methanol was added to precipitate a resin. The resin was washed with diethyl ether. Ethanol was added and the mixture was stirred. Then, azeotropic distillation was conducted to remove acetic acid.

The resulting resin (a) had a sulfoxide content of 5.4% by weight.

EXAMPLE 2

A sample (b) was synthesized in the same procedure as for Example 1 except that the vinyl chloride resin having hydroxyl groups was changed to a vinyl chloride-vinyl acetate-2-hydroxypropyl acrylate copolymer (polymerization degree=400, OH content=1.0% by weight) and the amounts of 3-methylthiopropionyl chloride, pyridine and 30% hydrogen peroxide were changed to 227 ml, 79 ml and 27 g, respectively. The resin (b) had a sulfoxide content of 2.6% by weight.

Using these samples (a) and (b), magnetic coatings and magnetic tapes were produced and evaluated according to the following methods. The results are shown in Table 1.

(1) Gloss

A mixture consisting of 400 parts by weight of a cobalt-adhered magnetic iron oxide powder (specific surface area=40 $m^2/g$), 50 parts by weight of a vinyl chloride resin, 40 parts by weight of a polyurethane resin (hydroxyl group content=0.3% by weight, 1.4-butanediol adipate-MDI type, molecular weight=70,000), 500 parts by weight of methyl ethyl ketone, 300 parts by weight of methyl isobutyl ketone, 300 parts by weight of toluene, 15 parts by weight of carbon black, 15 parts by weight of alumina, 8 parts by weight of myristic acid and 4 parts by weight of butyl stearate, was subjected to high-speed shearing and dispersion for 90 minutes. Thereto was added 15 parts by weight of a polyisocyanate (CORONATE L manufactured by NIPPON POLYURETHANE INDUSTRY CO., LTD.), and the mixture was subjected to dispersion for 15 minutes to obtain a magnetic coating. The coating was coated on a polyester film so as to give an "as dried" film thickness of 5. The film was subjected to an orientation treatment in a magnetic field and dried. The resulting magnetic film was measured for reflectivity at an reflection angle of 60°, using a gloss meter.

(2) Squareness

The magnetic film used for evaluation of gloss was cut into a size of 6 mm×6 mm. The cut piece was measured for squareness by a magnetic property tester.

(3) Durability

The magnetic film used for evaluation of gloss was subjected to a smoothening treatment using calender rolls and then to a heat treatment at 65° C. for 24 hours. The resulting film was contacted with a rotary drum to which a polishing paper was attached, with a load of 100 g applied to the film. The drum was rotated at 150 rpm and the extent of adhesion of the magnetic coating to the polishing paper was examined visually. ○ refers to "no staining" and X refers to "stained".

(4) Travelling

Using the same method as in evaluation of durability, the force which generated between the coating film and the rotary drum was measured using a U gauge, in an atomsphere of 65° C. (temperature) and 80% (relative humidity). A refers to "low", B refers to "intermediate", and C refers to "high".

TABLE 1

|  | Example 1 | Example 2 | Comp. Ex. 1 | Comp. Ex. 2 |
|---|---|---|---|---|
| Vinyl chloride resin | (a) | (b) | (c) | (d) |
| Gloss (%) | 87 | 85 | 45 | 75 |
| Squareness (—) | 0.81 | 0.80 | 0.68 | 0.72 |
| Durability (—) | ○ | ○ | X | X |
| Travelling (—) | A | A | C | B |

Notes
(c): Vinyl chloride-vinyl acetate-vinyl alcohol copolymer (average polymerization degree = 400, OH content = 2.2% by weight)
(c): Vinyl chloride-vinyl acetate-maleic acid-vinyl alcohol copolymer (average polymerization degree = 400, COOH content = 0.8% by weight, OH content = 1.0% by weight)

As shown in the above Examples, the use of the binder of the present invention provides a magnetic coating of good coatability wherein a fine magnetic powder is stably dispersed, and the magnetic recording medium of the present invention obtained using the coating has good surface smoothness and good surface durability and is excellent in travelling, magnetic property and electromagnetic conversion property.

We claim:

1. A magnetic recording medium comprising a non-magnetic substrate and a magnetic layer formed thereon, said magnetic layer comprising a binder and a magnetic powder dispersed in the binder, wherein said binder is a vinyl chloride resin which contains vinyl chloride units in an amount of at least 60 mole %, has an average polymerization degree of 100–900 and contains sulfoxide groups in an amount of 1 to 7% by weight.

2. The magnetic recording medium of claim 1 wherein said vinyl chloride resin has an average polymerization degree of 200 to 500.

3. The magnetic recording medium of claim 1 wherein said vinyl chloride resin contains sulfoxide groups in an amount of 2.6 to 5.4% by weight.

4. A magnetic recording medium comprising a non-magnetic substrate and a magnetic layer formed thereon, said magnetic layer comprising 10 to 100 parts by weight of a binder and 100 parts by weight of a magnetic powder dispersed in the binder, wherein said binder is a vinyl chloride copolymer which contains vinyl chloride units in an amount of at least 60 mole %, has an average polymerization degree of 100–900 and contains sulfoxide groups in an amount of: 1 to 7% by weight.

5. The magnetic recording medium of claim 4 wherein said vinyl chloride copolymer has an average polymerization degree of 200 to 500.

6. The magnetic recording medium of claim 4 wherein said vinyl chloride copolymer contains sulfoxide groups in an amount of 2.6 to 5.4% by weight.

7. The magnetic recording medium of claim 4 wherein said magnetic layer comprises 15 to 40 parts by weight of the binder and 100 parts by weight of the magnetic powder dispersed in the binder.

* * * * *